(12) United States Patent
Fanty et al.

(10) Patent No.: US 6,535,851 B1
(45) Date of Patent: Mar. 18, 2003

(54) SEGMENTATION APPROACH FOR SPEECH RECOGNITION SYSTEMS

(75) Inventors: Mark Fanty, Norfolk, MA (US); Michael S. Phillips, Belmont, MA (US)

(73) Assignee: SpeechWorks, International, Inc., Boston, MA (US)

( * ) Notice: Subject to any disclaimer, the term of this patent is extended or adjusted under 35 U.S.C. 154(b) by 0 days.

(21) Appl. No.: 09/534,707

(22) Filed: Mar. 24, 2000

(51) Int. Cl.[7] ............................................. G10L 15/04
(52) U.S. Cl. ......................... 704/249; 704/245; 704/250
(58) Field of Search ................................ 704/200, 206, 704/232, 241, 242, 243, 245, 249, 256, 254

(56) References Cited

U.S. PATENT DOCUMENTS

| | | | |
|---|---|---|---|
| 4,802,224 A | * | 1/1989 | Shiraki et al. ............... 704/245 |
| 4,980,917 A | | 12/1990 | Hutchins |
| 5,638,487 A | * | 6/1997 | Chigier ........................ 704/253 |
| 5,710,865 A | | 1/1998 | Abe |
| 5,799,276 A | * | 8/1998 | Komissarchik et al. ..... 704/251 |
| 5,862,519 A | * | 1/1999 | Sharma et al. .............. 704/231 |
| 5,913,188 A | | 6/1999 | Tzirkel-Hancock |
| 5,940,794 A | | 8/1999 | Abe |
| 6,366,883 B1 | * | 4/2002 | Campbell et al. ........... 704/260 |

* cited by examiner

Primary Examiner—Marsha D. Banks-Harold
Assistant Examiner—Daniel Abebe
(74) Attorney, Agent, or Firm—Hale and Dorr LLP

(57) ABSTRACT

Phonetic units are identified in a body of utterance data according to a novel segmentation approach. A body of received utterance data is processed and a set of candidate phonetic unit boundaries is determined that defines a set of candidate phonetic units. The set of candidate phonetic unit boundaries is determined based upon changes in Cepstral coefficient values, changes in utterance energy, changes in phonetic classification, broad category analysis (retroflex, back vowels, front vowels) and sonorant onset detection. The set of candidate phonetic unit boundaries is filtered by priority and proximity to other candidate phonetic units and by silence regions. The set of candidate phonetic units is filtered using no-cross region analysis to generate a set of filtered candidate phonetic units. No-cross region analysis generally involves discarding candidate phonetic units that completely span an energy up, energy down, dip or broad category type no-cross region. Finally, a set of phonetic units is selected from the set of filtered candidate phonetic units based upon the probabilities of candidate boundaries defining the ends of the unit and within the unit.

45 Claims, 13 Drawing Sheets

SEGMENTATION APPROACH FOR SPEECH RECOGNITION SYSTEMS

FIELD OF THE INVENTION

The invention relates generally to speech recognition systems, and relates more specifically to a segmentation approach used in speech recognition systems.

BACKGROUND OF THE INVENTION

Most speech recognition systems include a recognizer that processes utterance data and detects modeling units that typically correspond to linguistic phonemes. Recognizers typically generate several types of data including measurement data that is provided to a model computation stage which evaluates the measurement data to determine the likelihood that certain utterance data represents particular phonemes. As used herein, the term "utterance" refers to one or more sounds generated either by humans or by machines. Examples of an utterance include, but are not limited to, a single sound, any two or more sounds, a single word or two or more words. Utterance data is a data representation of an utterance.

Many recognizers are either frame-based or segment-based. Frame-based recognizers analyze portions of utterance data ("frames") and determine the likelihood that a particular frame of utterance data is part of a particular linguistic unit such as a phoneme. For example, a frame-based recognizer may analyze a 10 ms frame of utterance data and determine the likelihood that the 10 ms frame of utterance data is part of the phoneme "f". Frames that are determined to be part of the same phoneme are then grouped together.

In contrast to frame-based recognizers, segment-based recognizers, often referred to as "segmenters," analyze frames of utterance data to find logical segments that define linguistic units contained in the utterance data. Each segment is defined by two boundaries that define the beginning and end of a linguistic unit. Boundaries are typically characterized by a sharp rise or fall in utterance data values. Segmenters analyze frame data looking for segment boundaries. Once the boundaries (and segments) have been identified, segmenters determine the probability that each segment is a particular linguistic unit, e.g., an "f".

Segmenters tend to provide a relatively higher level of accuracy than frame-based recognizers because they are attempting to match an entire linguistic unit to a set of known linguistic units instead of trying to match a piece of a linguistic unit to a set of known linguistic units. However, frame-based recognizers generally provide better error recovery than segmenters since segmentation occurs during recognition instead of before recognition. That is, it can be difficult to recover from a segmentation error in segmenters, e.g., missing the first linguistic unit in a word. Some segmenters generate a large number of segments and then select an optimum set of segments to improve accuracy. However, the amount of computational resources that are required to process the segments is directly related to the number of segments. As a result, segmenters that attempt to improve accuracy by processing large numbers of segments can require significantly more computational resources than their frame-based counterparts.

Finding the boundaries that correspond to linguistic units like phonemes, is notoriously difficult. Given the sloppy nature of speech, sometimes there are no clear acoustic cues for boundaries. The result is that boundaries may be missed which further increases the likelihood that specific phonemes may not be recognized leading to reduced accuracy. Another problem is that boundaries may be incorrectly found in the utterance data where no linguistic units are present. This problem is common in silence regions where background noise is more easily misinterpreted as a linguistic unit. Finding too many boundaries (and segments) adversely affects the performance of speech recognition systems since their speed is highly dependent upon the number of segments processed. Processing segments requires computational resources and it is very important to limit the number of incorrect segment detections.

Based on the foregoing, there is a need for a speech recognizer mechanism that avoids the limitations in the prior approaches. There is a particular need for a speech recognizer mechanism that provides fast response with a relatively high level of accuracy while requiring a reduced amount of computational resources.

SUMMARY OF THE INVENTION

The foregoing needs, and other needs that will become apparent from the following description, are achieved by the present invention, a body of received utterance data is processed to determine a set of candidate phonetic unit boundaries that defines a set of candidate phonetic units. The set of candidate phonetic unit boundaries is determined based upon changes in Cepstral coefficient values, changes in utterance energy, changes in phonetic classification, broad category analysis (retroflex, back vowels, front vowels) and sonorant onset detection. The set of candidate phonetic unit boundaries is filtered by priority and proximity to other candidate phonetic units and by silence regions. The set of candidate phonetic units is filtered using no-cross region analysis to generate a set of filtered candidate phonetic units. No-cross region analysis generally involves discarding candidate phonetic units that completely span an energy up, energy down, dip or broad category type no-cross region. Finally, a set of phonetic units is selected from the set of filtered candidate phonetic units based upon differences in utterance energy.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of example embodiments are described in more detail in the following sections: (1) introduction; (2) system overview; (3) functional overview; (4) determining candidate boundaries; (5) filtering candidate boundaries by priority and proximity to reduce the number of candidate segments; (6) filtering candidate boundaries contained in silence regions to reduce the number of candidate segments; (7) filtering candidate segments using no-cross region analysis; (8) selecting final segments from candidate segments; (9) pipelining considerations; and (10) implementation mechanisms.

1. Introduction

A computer-implemented segmentation approach for modeling speech in a speech recognition system is described. In general, various techniques are used to evaluate utterance data and to determine a set of candidate boundaries that define a segment lattice. The segment lattice is then evaluated to determine a final set of segments that accurately model the utterance data.

2. System Overview

Figure 1:
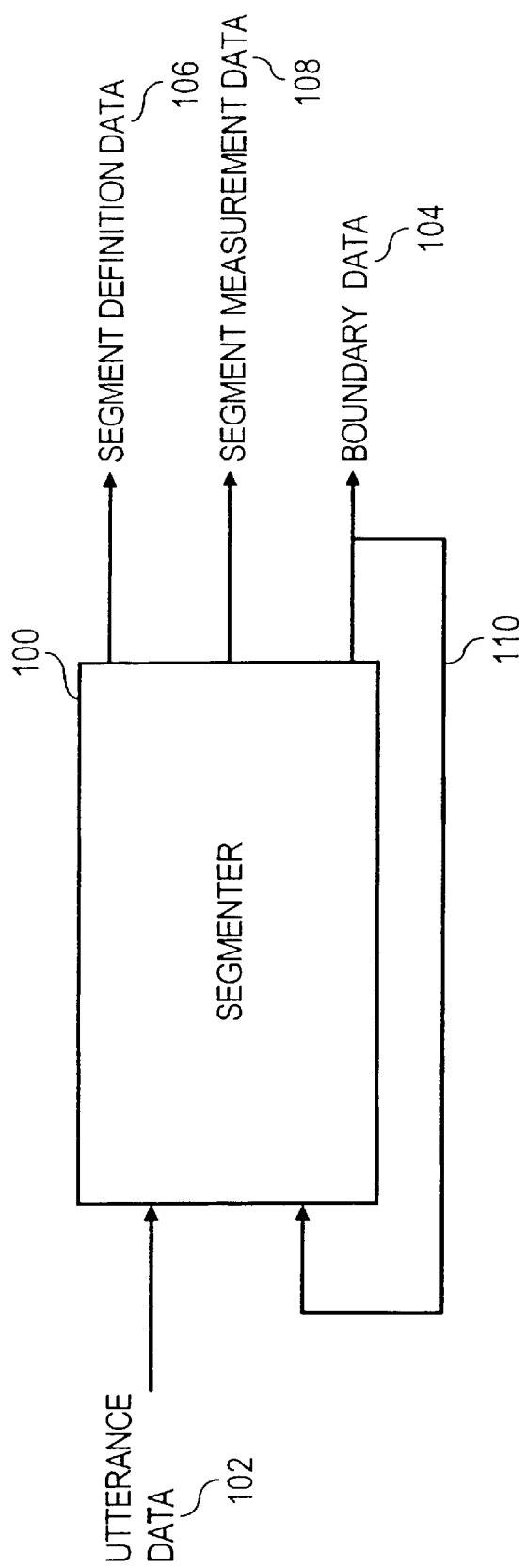
FIG. 1 is a block diagram of a segmenter for modeling speech in a speech recognition system according to an embodiment.

FIG. 1 illustrates a segmenter 100 for modeling speech according to the various embodiments described herein. Segmenter 100 may be implemented as a stand alone element or as a stage of a recognizer in a speech recognition system (not illustrated), depending upon the requirements of a particular application. Segmenter 100 receives and processes utterance data 102. The approach for modeling speech described herein may be used with utterance data of any type or form. For purposes of explanation only, utterance data 102 is described herein in the form of contiguous frames of fixed length.

Segmenter 100 generates boundary data 104 that specifies candidate boundaries that define a segment lattice. Segmenter 100 also generates segment definition data 106 and segment measurement data 108. Segment definition data 106 defines the set of segments selected by segmenter 100 from the candidate boundaries specified by boundary data 104. Segment measurement data 108 includes acoustic features for each segment. Boundary data 104, segment definition data 106 and segment measurement data 108 are typically provided as inputs to a model computation stage in a speech recognition system. Boundary data 104 is also provided as a feedback input to segmenter 100, as indicated by link 110.

3. Functional Overview

Figure 2:
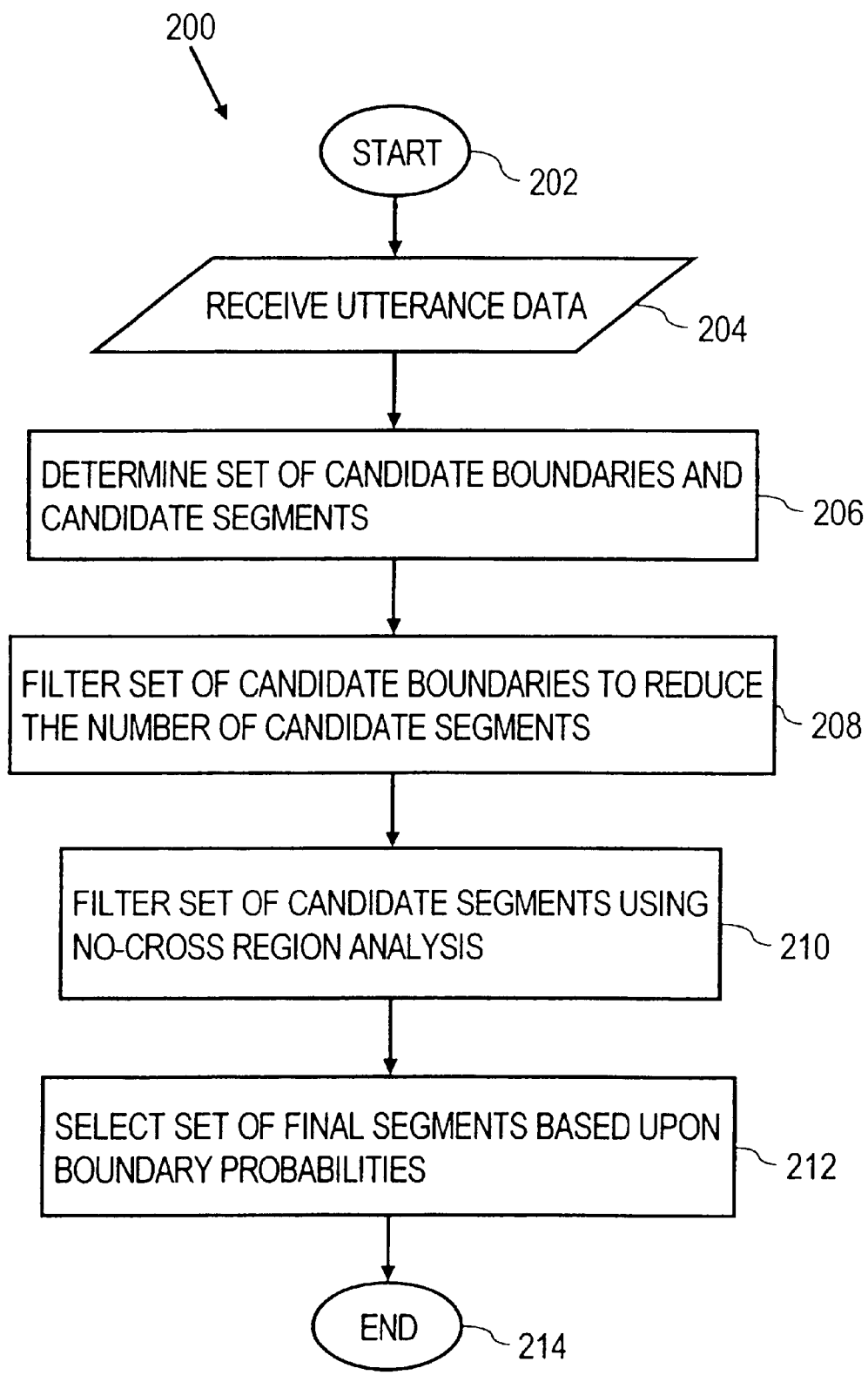
FIG. 2 is a flow diagram of an approach for modeling speech according to an embodiment.
Figure 3:
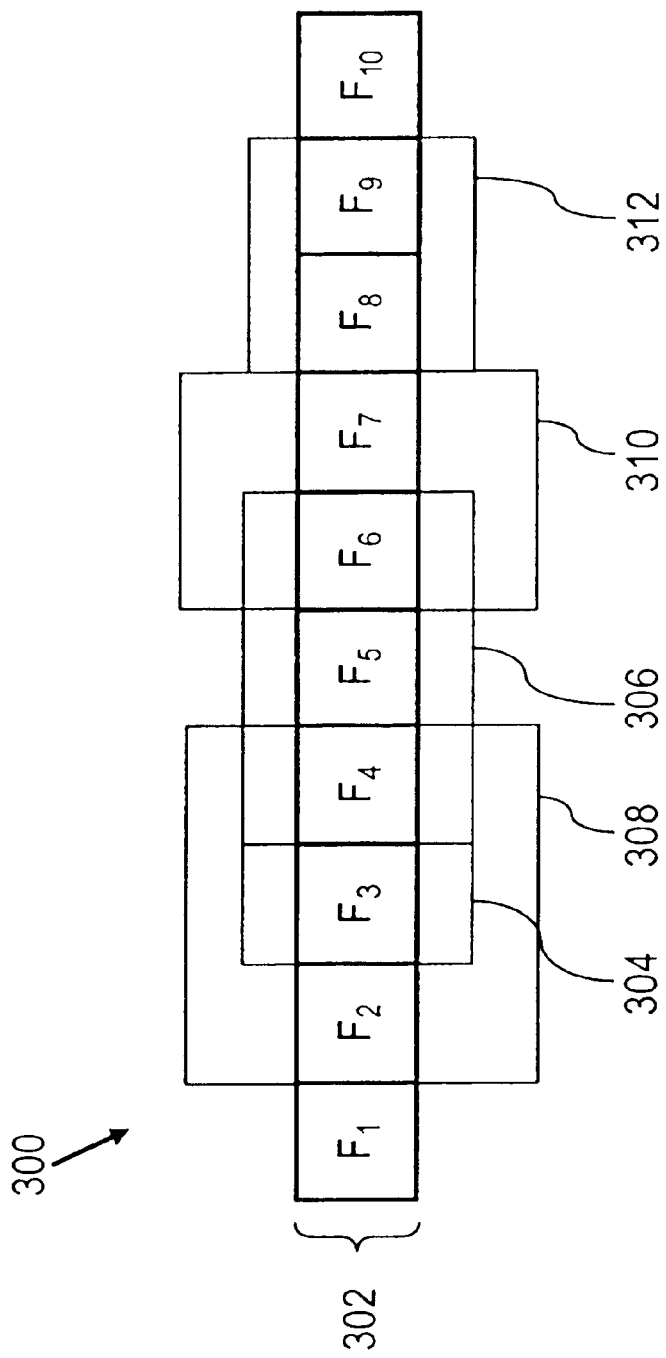
FIG. 3 is a block diagram of ten (10) frames of utterance data ($F_1$ through $F_{10}$).

The segmentation approach for modeling speech according to one embodiment is illustrated in a flow diagram 200 of FIG. 2. After starting in step 202, in step 204, utterance data 102 is received by segmenter 100. As described herein, utterance data 102 is in the form of contiguous frames of a fixed size, e.g., 10 milliseconds (ms). The frames of utterance data may represent an entire utterance, or a portion of an utterance. Embodiments are not limited to utterance data 102 being in a particular format or size. According to an embodiment, each frame of utterance data 102 includes N number of Cepstral coefficients ($C_0, C_1, \ldots, C_{11}$) and M number of spectral coefficients ($S_0, S_1, \ldots S_m$). For example, fourteen (14) Cepstral coefficients may be used. As is well known in the art, Cepstral coefficients are the coefficients of the Fourier transform representation of the log magnitude spectrum, i.e., energy as a function of frequency. The use of Cepstral and spectral coefficients in the context of speech recognition systems is described in "Fundamentals of Speech Recognition" by Lawrence Rabiner and Biing-Hwang Juang, Prentice Hall, 1993. FIG. 3 is a block diagram 300 that illustrates a portion of utterance data 102 in the form of ten (10) frames of utterance data 302, individually identified as $F_1$ through $F_{10}$.

In step 206, a set of candidate boundaries and candidate segments are determined from utterance data 102 according to various techniques described in more detail hereinafter. Candidate boundaries may only be established at the boundaries of frames 302 since the boundaries of frames 302 are the smallest granularity available to segmenter 100. The set of candidate boundaries defines a lattice of overlapping candidate segments, as represented in FIG. 3 by segments 304, 306, 308, 310 and 312.

In step 208, the set of candidate boundaries is filtered to reduce the number of candidate segments. Reducing the number of candidate segments provides the benefit of reducing the amount of computation resources required to process the candidate segments and select the set of final segments.

In step 210, the set of candidate segments is filtered using no-cross region analysis to generate a set of filtered candidate segments, as described in more detail hereinafter.

In step 212, a set of final segments is selected from the set of filtered candidate segments based upon boundary probabilities determined when the candidate boundaries were identified. The process is complete in step 214.

4. Determining Candidate Boundaries

Candidate boundaries define a segment lattice that models utterance data 102 and from which the final segments are selected. The number of candidate boundaries selected depends upon a desired accuracy and the computational resources that are available to process the candidate boundaries. A larger number of candidate boundaries generally requires more computational resources. According to an embodiment, several techniques are employed to determine the set of candidate boundaries. These techniques include: (a) Cepstral difference; (b) energy difference; (c) phonetic difference; (d) broad category analysis; and (e) sonorant onset detection.

(a) Cepstral Difference

According to one embodiment, a difference in Cepstral coefficients is used to detect boundaries in frames. The Cepstral coefficients for a set of frames are first "smoothed" to attenuate the effects of quick changes or "chopiness" that often occurs in speech. Frame smoothing generally involves for each frame, averaging Cepstral coefficients over several frames. For example, to smooth a particular frame, the Cepstral coefficients for N number of frames to the left of (after) the particular frame are averaged together and the Cepstral coefficients for the particular frame and N−1 number of frames to the right of (before) the particular frame are averaged together. The difference between these two averages is used as the difference value for the particular frame.

Once the Cepstral coefficients have been smoothed, they are normalized or scaled to compensate for differences in Cepstal coefficient ranges. For example, one Cepstral coefficient might have a range of (0.0) to (1.0) while another Cepstral coefficient might have a range of (0.0) to (100, 000.00). According to one embodiment, the Cepstral coefficients in each frame are normalized by their standard deviation.

After the Cepstral coefficients have been scaled, the Cepstral coefficients are analyzed to identify boundaries in the frames. Analyzing the frames generally involves comparing N number of frames to the left and right of each possible boundary (a boundary separates two frames) to determine whether the current frame (by convention, the frame right of the boundary being considered) contains a peak in some difference measure. As used herein, a peak is defined as a local maximum that exceeds a specified threshold with a sufficiently large drop on either side.

Figure 4:
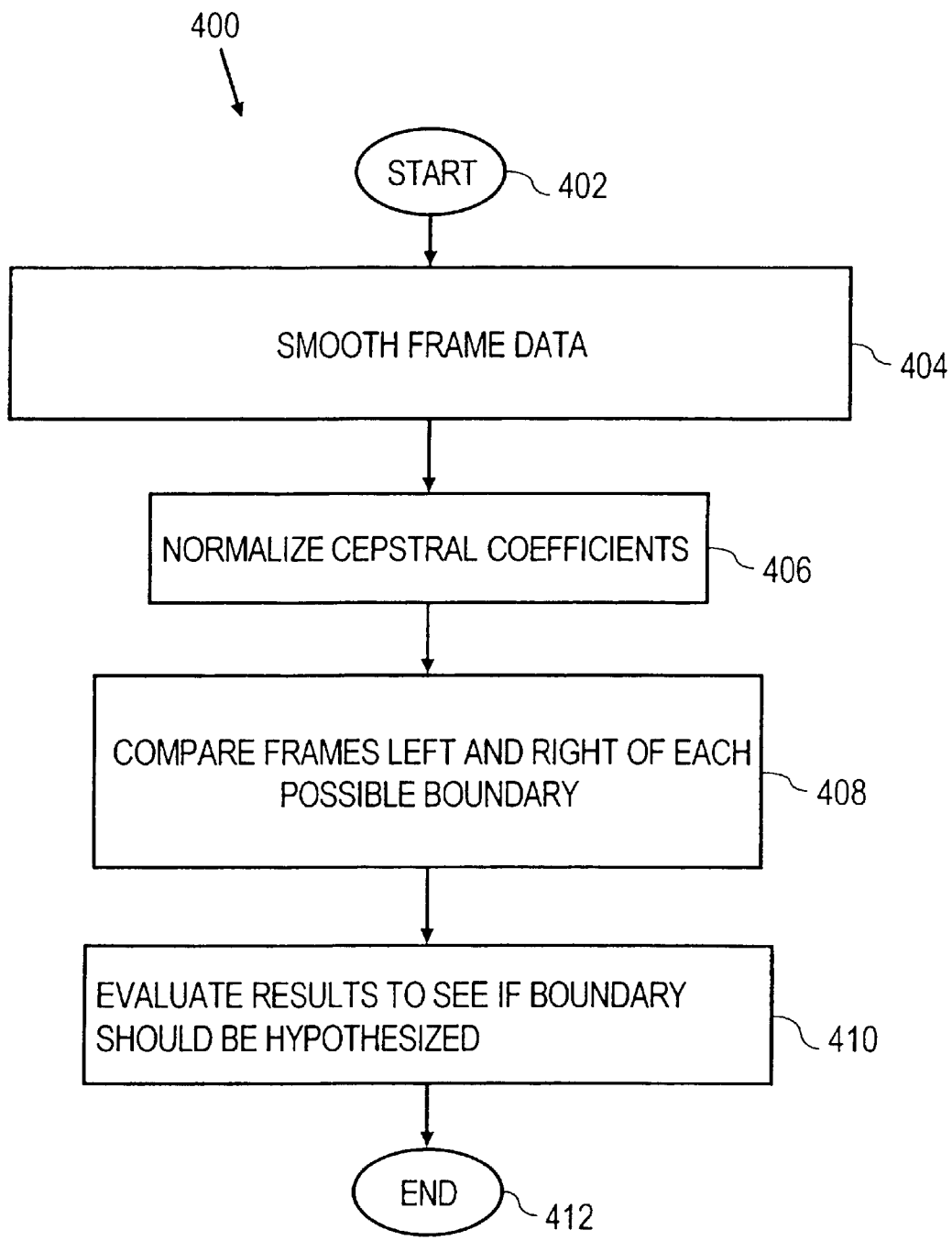
FIG. 4 is a flow diagram of an approach for using Cepstral coefficients to identify a boundary in a frame according to an embodiment.
Figure 5:
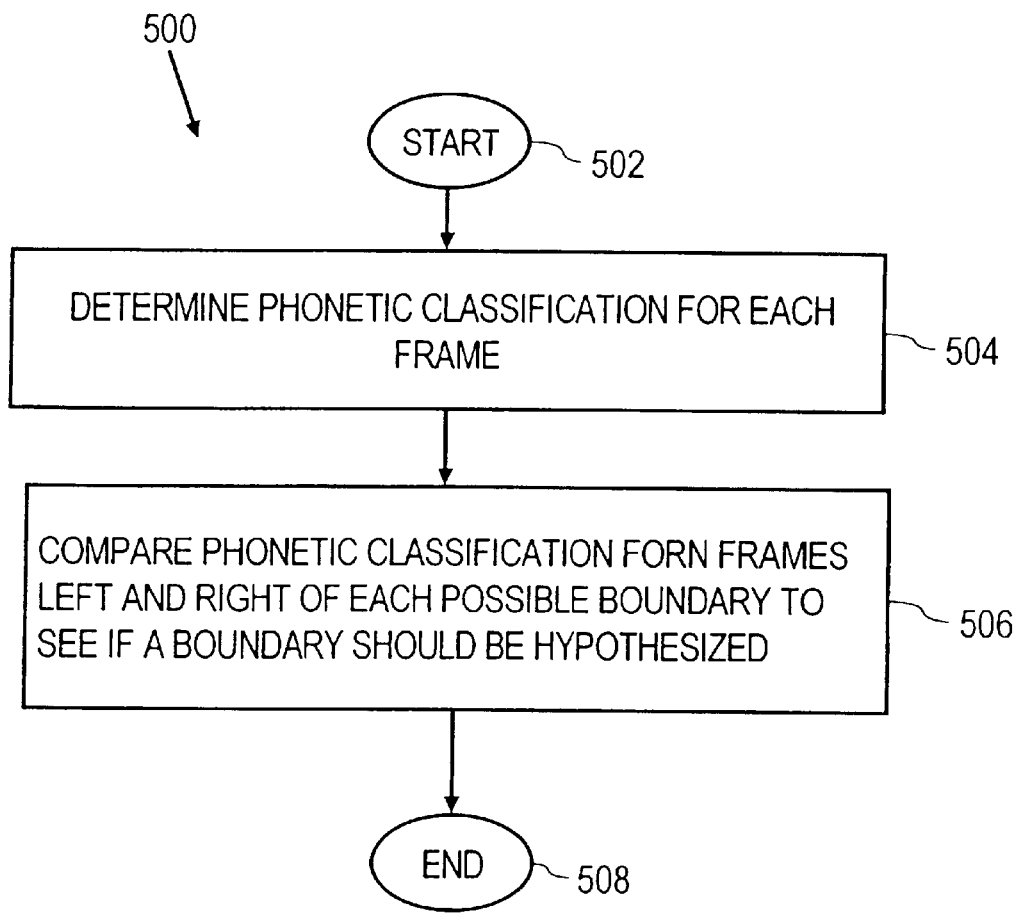
FIG. 5 is a flow diagram of an approach for using phonetic differences to identify boundary in a frame according to an embodiment.

FIG. 4 is a flow diagram 400 illustrating the approach for using Cepstral coefficients for detecting boundaries in frames according to an embodiment. After starting in step 402, in step 404, the frame data is smoothed over several frames. Referring to FIG. 3, for purposes of this example, the current frame is frame $F_5$, N is three and each frame is defined by fourteen (14) Cepstral coefficients. First, the average of Cepstral coefficients $C_0$ through $C_{13}$ for frames $F_2$, $F_3$ and $F_4$ is determined. The average of Cepstral coefficients $C_0$ through $C_{13}$ for frames $F_5$, $F_6$ and $F_7$ is also determined. In step 406, the averaged Cepstral coefficients computed in step 404 are normalized using their standard deviation.

In step 408, the averaged and normalized Cepstral vectors from the left and right are compared (the difference measure is Euclidean distance)In step 410, the differences measured in step 408 are searched in a left to right manner in order to find local maxima or peaks in the difference measure which are larger than the nearby local minima by more that a threshold amount. The process is complete in step 412.

(b) Energy Difference

According to one embodiment, a detected difference in energy is used to identify a boundary in the current frame. As is well understood by one of skill in the art, utterance energy is represented in Cepstral coefficient $C_0$. Therefore, according to this embodiment, the steps used to compute Cepstral difference peaks are repeated using only $C_0$.

(c) Phonetic Difference

According to an embodiment, phonetic difference is used to identify boundaries. A significant change in phonetic classification generally indicates the presence of a boundary, i.e., the start of a different phoneme. According to one embodiment, the phonetic classification of a particular frame is determined by processing the particular frame using a neural network to score the particular frame for M number of phonemes. The result of this analysis is a vector of phoneme probabilities at each frame. This vector is then be treated just like the Cepstral vector to find peaks in a difference function at which to hypothesis boundaries.

(d) Broad Category Analysis

According to one embodiment, broad category analysis is used to identify boundaries that might not ordinarily be detected by evaluating waveform energy patterns, especially inside sonorant regions. For example, it can be particularly difficult to detect boundaries between the /r/ and /iy/ in "three" or between the /w/ and /ah/ in "one" because of subtle transitions or "slurring" between these phonemes. The problem can be further exacerbated by background noise.

Broad category analysis involves detecting certain speech components that have relatively unique spectral characteristics, such as back vowels, front vowels and retroflex. In general, similar sounds are combined into broad categories and frames of utterance data are evaluated against the broad categories. A sharp change near the location where a broad category score tails off indicates the presence of a boundary.

Figure 6A:
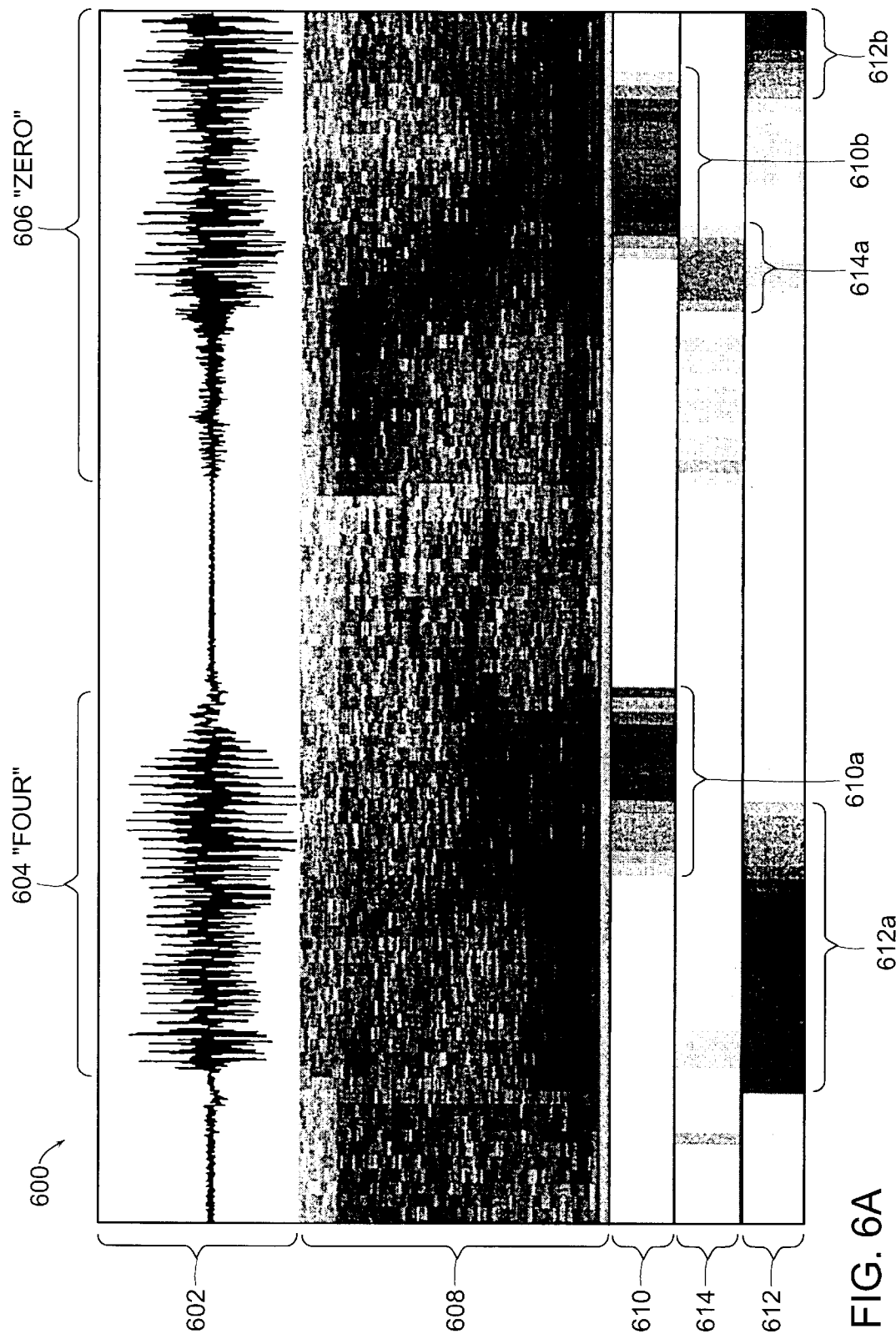
FIG. 6A is a diagram illustrating an utterance waveform, a spectragram and probabilities of three types of broad phonetic categories used to detect boundaries according to an embodiment.

FIG. 6A is a diagram 600 that includes an utterance waveform 602 for the utterance "four", represented by portion 604, and the utterance "zero", represented by portion 606. Diagram 600 also includes a spectragram 608 that graphically illustrates the energy of utterance waveform 602 at various frequencies. According to one embodiment, three types of broad categories are used to detect boundaries: (i) retroflex; (ii) back vowels and related sounds; and (iii) front vowels and related sounds.

i. Retroflex

The retroflex category refers to the "r" family of sounds that have unique spectral characteristics. Diagram 600 includes a retroflex graph 610 that illustrates a scoring of utterance waveform 602 for retroflex, i.e., the presence of "r"'s, where darker shading indicates a higher score and a higher probability that an "r" (or similar sound) is contained in utterance waveform 602.

For example, as illustrated by utterance waveform 602, there is relatively little change in the waveform energy at the right side of portion 604, at the approximate location of the "r" in "four." Thus, it may be difficult to identify the "r" in "four" by relying upon detecting a change in waveform energy alone. However, portion 610*a* of retroflex graph 610 graphically illustrates a relatively high retroflex score, indicating the high likelihood that the end of portion 604 contains an "r".

As another example, in portion 606 of utterance waveform 602, it can be difficult to detect the "e" to "r" boundary in "zero" by relying upon a change in waveform energy because of the subtle transition between these two phonemes can be difficult to detect in waveform 602. However, portion 610*b* of retroflex graph 610 graphically illustrates a relatively high retroflex score, indicating the high likelihood that the middle section of portion 606 contains an "r". As illustrated by these two example, retroflex information can be very useful for identifying the presence of "r" boundaries.

According to one embodiment, two types of retroflex characteristics are used to identify retroflex boundaries based upon retroflex scores normalized to a range of zero (0) to one (1). First, retroflex boundaries are identified at locations where retroflex scores rise or fall from 0.1 to 0.4 in fifteen (15) frames or less. Second, retroflex boundaries are identified at locations where retroflex scores rise or fall from 0.01 to 0.2 in five (5) frames or less. The second situation allows retroflex boundaries to be detected for much weaker "r" phonemes that change more rapidly from a very low point.

(ii) Back Vowels and Related Sounds

According to one embodiment, back vowels and related sound information is used to detect boundaries in utterance data where conventional energy change techniques are often less useful. Back vowels and related sounds are characterized by being formed in the back of the human mouth and have unique spectral characteristics. In FIG. 6, the "ao" and "r" phonemes in portion 604 can be difficult to detect by relying upon a change in waveform energy, since the waveform energy in the first two thirds of portion 604 is relatively constant. However, portion 612a graphically illustrates a relatively high back vowel score, indicating a high likelihood that approximately the first two thirds of portion 604 contains a back vowel or related sound. Using the back vowel information in this manner reduces the likelihood that the "ao" and "r" phoneme boundaries will be missed.

Similarly, the "ow" phoneme can be difficult to detect in portion 606 by relying upon a change in waveform energy since the waveform energy towards the end of portion 606 is relatively constant. However, portion 612b graphically illustrates a relatively high back vowel score, indicating a high likelihood that the end of portion 606 contains a back vowel or related sound.

(iii) Front Vowels and Related Sounds

According to one embodiment, front vowels and related sound information is used to detect boundaries in utterance data where conventional energy change techniques are often less useful. Front vowels and related sounds are characterized by being formed in the front of the human mouth and have unique spectragram characteristics. In FIG. 6, the "iy" phoneme in portion 606 can be difficult to detect by relying upon a change in waveform energy, since the "iy" and "r" phonemes tend to run together. However, portion 614a graphically illustrates a relatively high back vowel score, indicating a high likelihood that approximately the first two thirds of portion 604 contain a front vowel or related sound. Using the front vowel information in this manner reduces the likelihood that the "iy" phoneme boundary will be missed.

(e) Sonorant Onset Detection

In the English language, phonetic units that contain a consonant immediately followed by a vowel can be particularly difficult to recognize because the trailing vowel tends to "soften" the consonant. This problem is particularly acute with voiced stops like "b" followed by a vowel, for example in the phonetic unit "be".

This problem is addressed in accordance with an embodiment wherein the first three frames of a sonorant coming from silence are designated as a possible segment. The implementation is as follows (after energy up no-cross region analysis has been performed). For every identified energy up type no-cross region, a determination is made whether the end point of the energy up type no-cross region is in a sonorant. This may be determnined, for example, by determining whether the sonorant broad category score is greater than 0.5, meaning that the energy up type no-cross region is more likely than not to be in a sonorant. If the energy up type no-cross region is in a sonorant, then the location of the first prior phonetic difference type boundary is identified and reassigned the highest priority, e.g. a priority of one. Then a new boundary of the highest priority is created three (3) frames ahead of that phonetic difference type boundary.

Figure 6B:
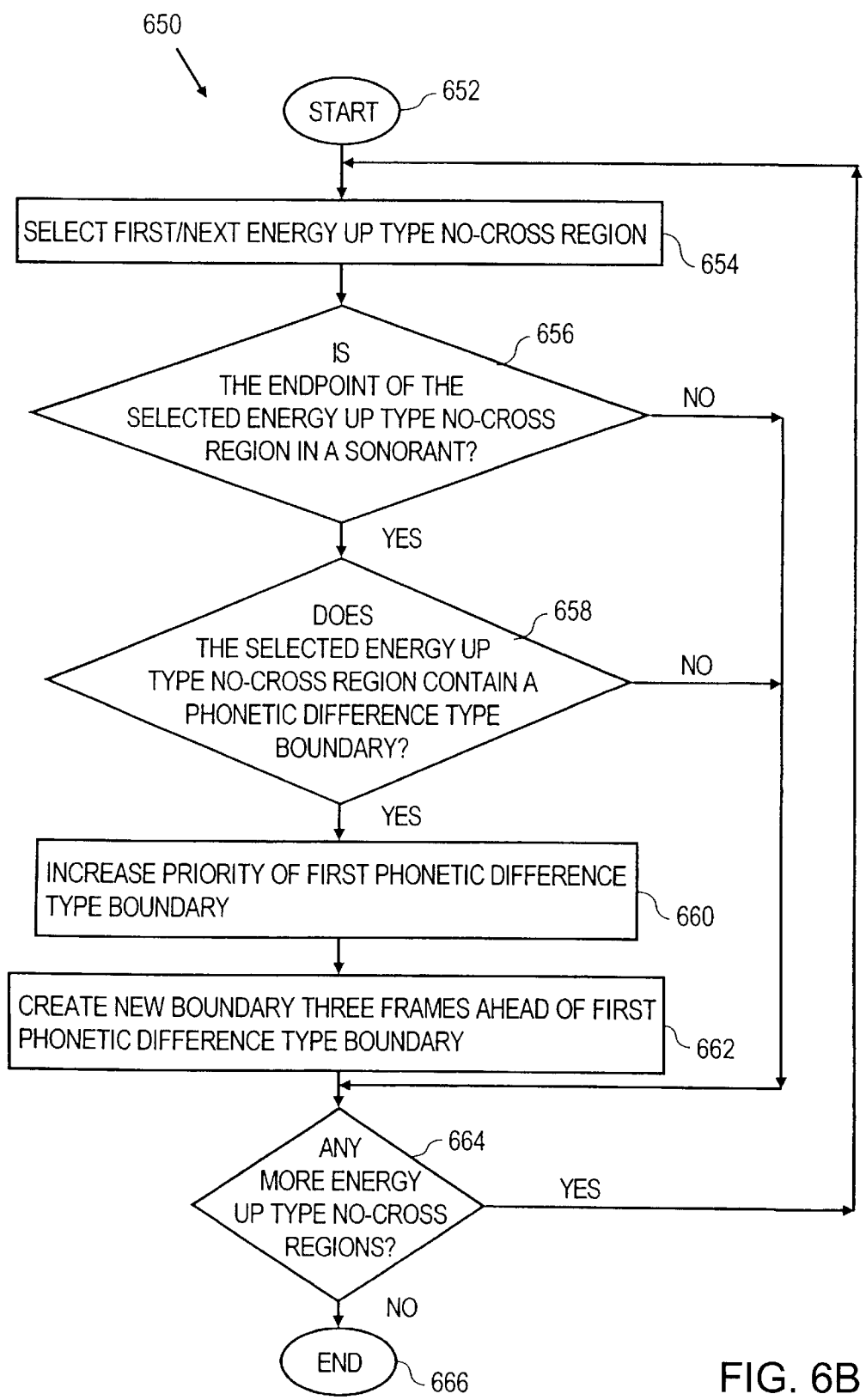
FIG. 6B is a flow diagram illustrating an approach for handling sonorant onset detection according to an embodiment.

FIG. 6B is a flow diagram 650 illustrating an approach for handling sonorant onset detection according to an embodiment. After starting in step 652, in step 654, the first energy up type no-cross region is selected. In step 656, a determination is made whether the endpoint of the selected energy up type no-cross region is in a sonorant. As previously described, this determination may be made, for example, by determining whether the sonorant score for the selected energy up type no-cross region is greater than 0.5.

If so, then in step 658, a determination is made whether the selected energy up type no-cross region contains a phonetic difference type boundary. If so, then in step 660, the priority of the first phonetic difference type boundary is increased to the highest priority. Then, in step 662, a new boundary is created three frames ahead of the first phonetic difference type boundary.

Control then proceeds to step 664, where a determination is made whether there are any more energy up type no-cross regions. Note that step 664 is also reached from step 656 if the endpoint of the selected energy type no-cross region is not in a sonorant. Step 664 is also reached from step 658 if the selected energy up type no-cross region does not contain a phonetic difference type boundary.

If, in step 664, there are more energy up type no-cross regions, then control returns to step 654 where the next energy up type no-cross region is selected. Otherwise, the process is complete in step 666.

5. Filtering Candidate Boundarier by Priority and Proximity to Reduce the Number of Candidate Segments The set of candidate boundaries defines a set of candidate segments, where each candidate segment is defined by a pair of candidate boundary at its end points. As previously described, it is generally desirable to reduce the number of segments to reduce the amount of computational resources required to process the segments. According to one embodiment, the set of candidate boundaries are filtered by discarding candidate boundaries that are in close proximity to other higher priority candidate boundaries. This filtering reduces the number of candidate segments and ultimately, the number of final segments. As described herein, reducing the number of final segments is advantageous because it reduces the amount of computational resources required to evaluate the final segments.

Candidate boundaries are prioritized based upon the approach used to generate them. According to one embodiment, candidate boundaries are prioritized as follows, where "1" represents the highest relative priority and "4" represents the lowest relative priority:

| Boundary Type | Priority |
| --- | --- |
| Sonorant Onset Boundaries | 1 |
| Cepstral Difference Boundaries | 2 |
| Energy Difference Boundaries | 2 |
| Phonetic Difference Boundaries | 2 |
| Broad Category Analysis Boundaries | 3 |
| No-Cross Region Boundaries (all types) | 4 |

During the filtering process, the priority of a current candidate boundary is compared to the priorities of other candidate boundaries within N number of frames of the current candidate boundary. If the current candidate boundary has a lower priority than at least one other candidate boundary within N number of frames of the current candidate boundary, then the current candidate boundary is discarded. The set of remaining candidate boundaries after filtering is referred to herein as the "filtered candidate boundaries." Ideally, the filtered candidate boundaries provide a set of final segments that are at least as accurate as the set of final segments determined from the original candidate boundaries, while requiring fewer computational resources.

Figure 7A:
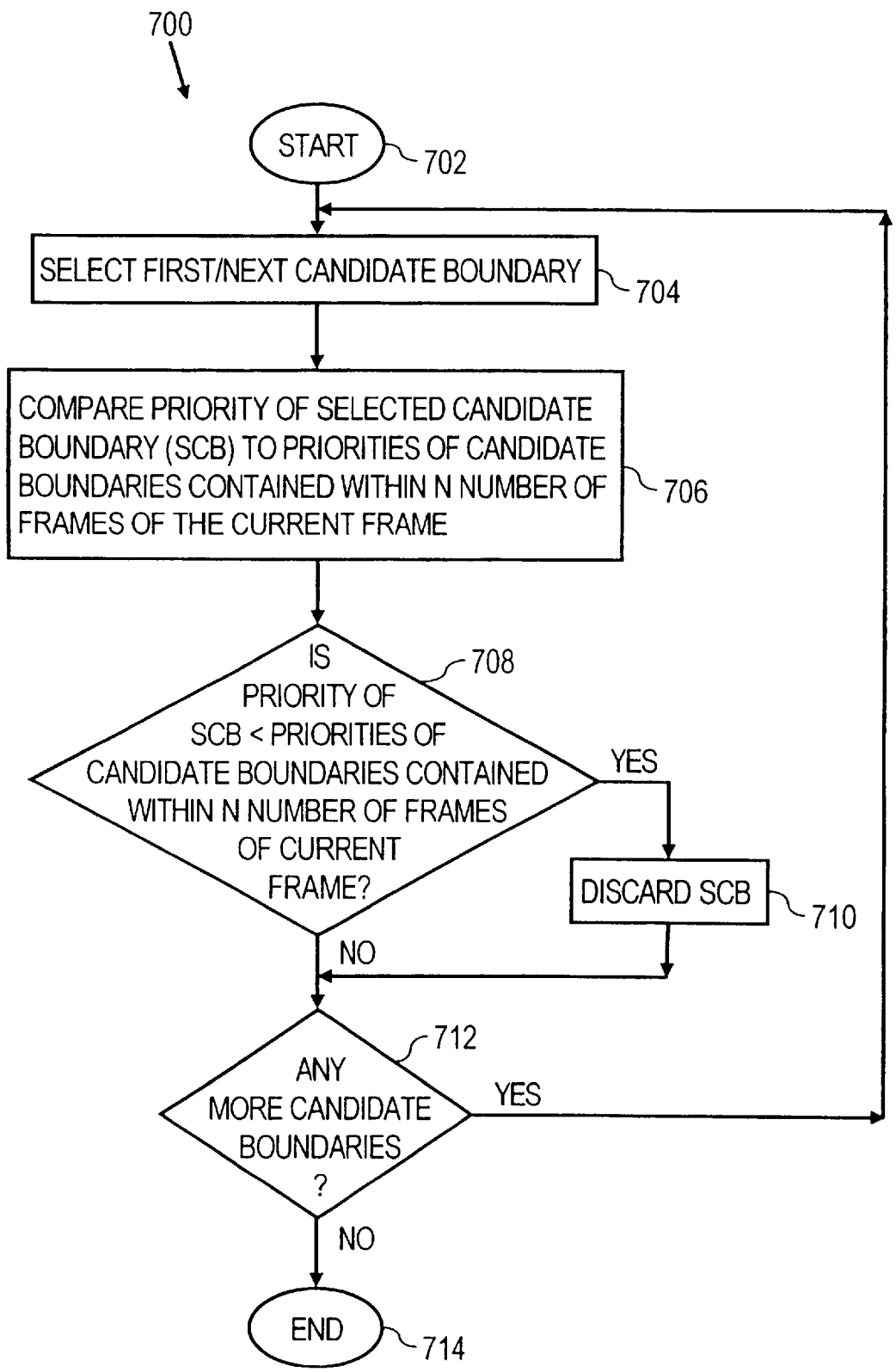
FIG. 7A is a flow diagram illustrating an approach for filtering candidate boundaries by priority and proximity according to an embodiment.

FIG. 7A is a flow diagram 700 illustrating an approach for filtering candidate boundaries according to an embodiment. After starting in step 702, in step 704, the first candidate boundary is selected from the set of candidate boundaries. In step 706, the priority of the selected candidate boundary (SCB) is compared to the priorities of candidate boundaries contained within N number of frames (left or right) of the current frame that contains the SCB. According to one embodiment, N number of frames is three frames.

In step 708, a determination is made whether the priority of the SCB is less than the priorities of the candidate boundaries contained within N number of frames of the current frame. If so, then in step 710, the SCB is discarded. In step 712, a determination is made whether there are any more candidate boundaries to be processed. If so, the control returns to step 704, where the next candidate boundary is selected. If not, then the process is complete in step 714.

6. Filtering Candidate Boundaries Contained in Silence Regions to Reduce the Number of Candidate Segments Another issue in speech recognition systems is the effect of silence on recognizing phonetic units. Silence regions are characterized by uniquely low energy. Many conventional segment-based speech recognition systems generate a large number of segments in silence regions because absent the low energy, there can be some relatively large acoustic changes occurring in silence regions.

According to an embodiment, candidate boundaries contained in silence regions are filtered (discarded) to reduce the number of candidate segments that have to be processed. First, silence regions are identified in utterance data based upon an analysis of the corresponding histogram of the filtered low energy. Regions containing energy below a specified maximum level for a specified minimum amount of time qualify as silence regions. The ends of the silence regions are then moved inward, reducing the size of the silence regions. This is done to accommodate weak phonetic units, for example /f/, that may otherwise be mistaken for silence. Since weak phonetic units such as these are usually near "stronger" speech, i.e., higher energy utterance data, reducing the size of the silence regions adequately accounts for the weak phonetic units. All boundaries contained within the identified silence regions are then discarded to further define the filtered boundaries.

Figure 7B:
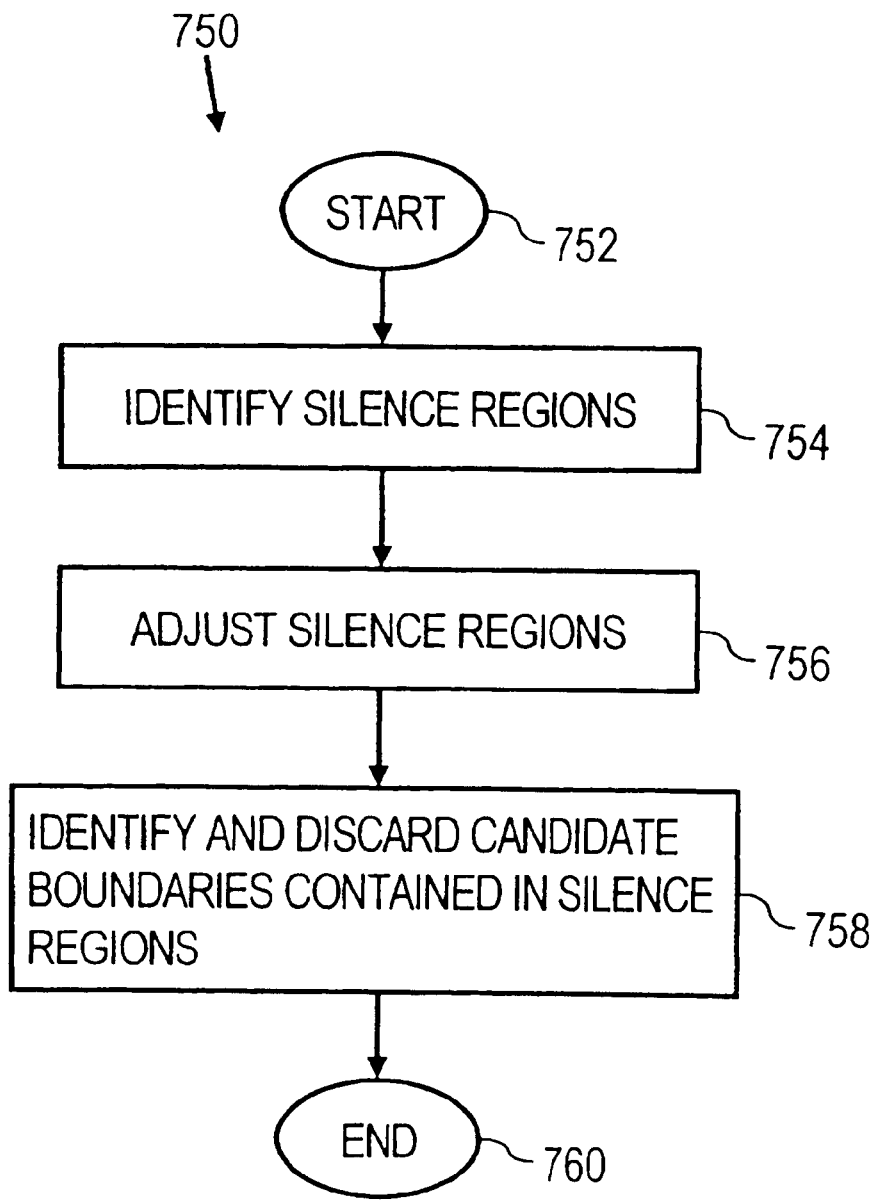
FIG. 7B is a flow diagram 750 illustrating an approach for filtering candidate boundaries contained in silence regions according to an embodiment.

FIG. 7B is a flow diagram 750 illustrating an approach for filtering candidate boundaries contained in silence regions according to an embodiment. After starting in step 752, in step 754, the set of silence regions is identified. As previously described, the filtered low energy is examined to identify silence regions. Regions of utterance data having filtered low energy that is below a specified energy threshold for a specified minimum silence regions duration qualify as silence regions.

In step 756, the identified silence regions are adjusted to account for the presence of weak phonetic units. Specifically, the start and end points of the identified silence regions are moved inward by a specified adjustment size to reduce the size of the identified silence regions.

In step 758, candidate boundaries contained in the adjusted silence regions are discarded. The process is complete in step 760. Once the process has been completed, the resulting candidate boundaries are the filtered candidate boundaries that define the set of candidate segments.

7. Filtering Candidate Segments Using No-Cross Region Analysis

As used herein, the term "no-cross region" refers to a portion of utterance data that is very likely to contain a boundary because of its characteristic acoustic properties. During no-cross region analysis, energy measurement data is evaluated to identify no-cross regions contained in the utterance data. Candidate segments, as determined by the boundary filtering mechanisms described herein, are then evaluated to determine whether they completely span or cover a no-cross region. Candidate segments that completely span or cover a no-cross region are discarded and not used as final segments. According to one embodiment, four types of no-cross regions include (i) energy up; (ii) energy down; (iii) dip; and (iv) broad category.

i. Energy Up

Figure 8:
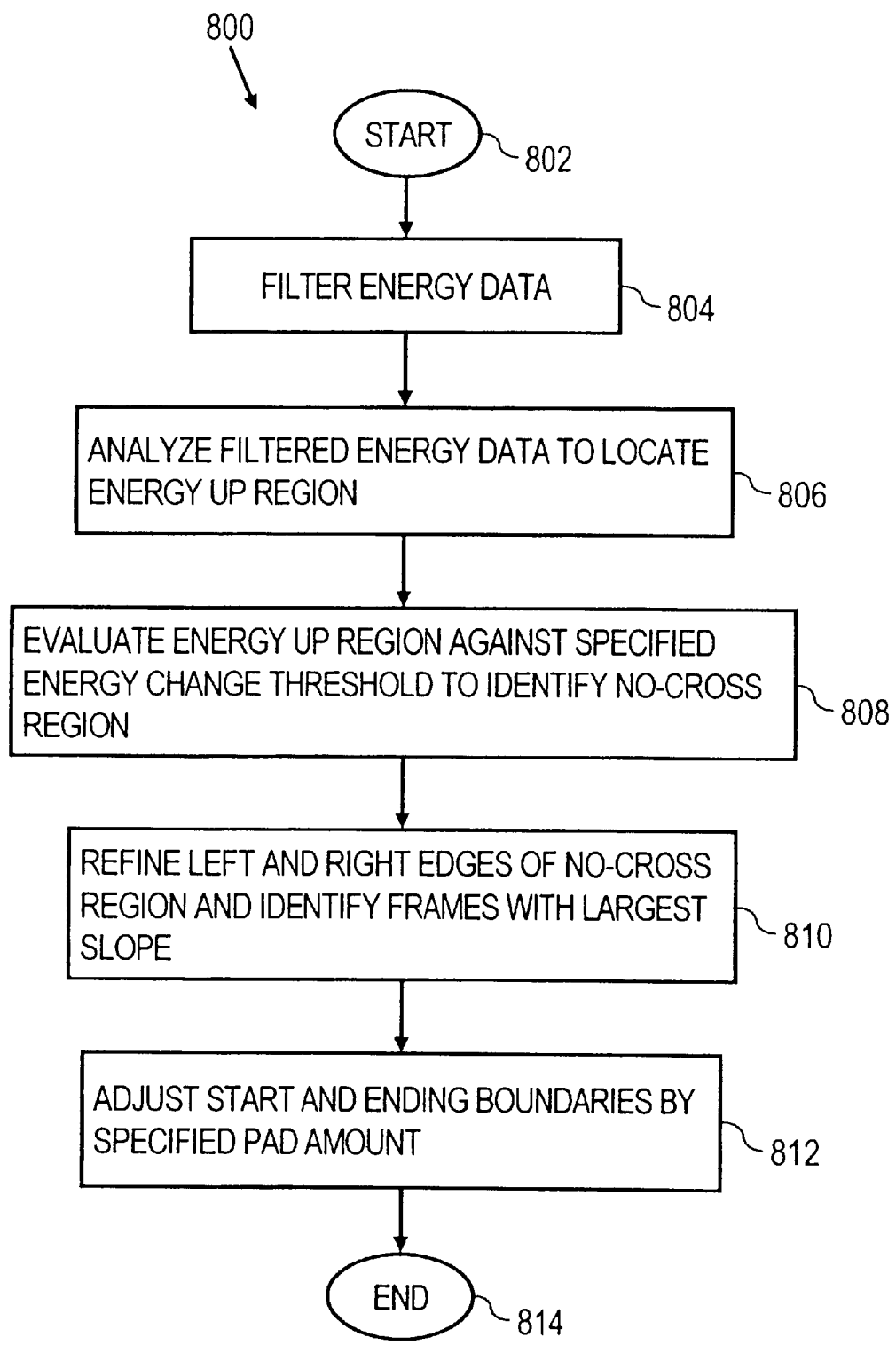
FIG. 8 is a flow diagram illustrating an approach for identifying an energy up type no-cross region according to an embodiment.

An energy up type no-cross region is characterized by a sufficiently large increase in energy over a specified time, i.e., having a specified slope. FIG. 8 is a flow diagram 800 illustrating an approach for identifying an energy up type no-cross region according to an embodiment. After starting in step 802, in step 804, energy data received by segmenter 100 is filtered. According to one embodiment, low frequency energy contained in utterance data 102 (FIG. 1) (as opposed to the $C_0$ Cepstral coefficients) are filtered to remove noise that might otherwise be interpreted as an energy up characteristic. Low pass filtering is employed, although other types of filtering may be used.

In step 806, frames of utterance data 102 are evaluated to identify energy up regions. According to an embodiment, the start of a energy up region is characterized by a one-frame increase in filtered low energy that satisfies, e.g., exceeds, a specified start slope threshold. Once the start of an energy up region is detected, adjacent frames are evaluated to locate the corresponding end of the identified energy up region. According to an embodiment, the end of an energy up region is characterized by frames having filtered low energy change that satisfies, e.g., is less than, a specified end slope threshold.

In step 808, the frames of the energy up region are evaluated against a specified energy change threshold. If the frames of the energy up region satisfy, i.e., exceed, the specified energy change threshold, then the energy up region qualifies as energy up type no-cross regions.

Once an energy up type no-cross region has been identified, then in step 810, the boundaries of the energy up type no-cross region are refined using unfiltered low-frequency energy. First, the left edge of the energy up type no-cross region is refined by finding the first frame that has energy more than a specified edge threshold from the beginning of the energy up type no-cross region. Second, the right edge of the energy up type no-cross region is refined by finding the first frame that has energy more than the specified edge threshold less than the end of the energy up type no-cross region. Third, the largest one frame increase, i.e., with the largest slope, is located.

Finally, in step 812, a specified pad amount is subtracted from the refined starting boundary and added to the refined ending boundary of the energy up type no-cross region. The process is complete in step 814.

ii. Energy Down Energy down type no-cross regions are very similar to energy up type no-cross regions, except that energy down type no-cross regions are characterized by large decreases in energy over a specified time. Referring to flow diagram 800, steps 802 and 804 are the same for detecting energy down type no-cross regions as for energy up type no-cross regions.

In step 806, frames of utterance data 102 are evaluated to identify an energy down region. According to an embodiment, the start of a energy down region is characterized by a one-frame decrease in filtered low energy that satisfies, e.g., exceeds, a specified start slope threshold. Once the start of a energy down region is detected, adjacent frames are evaluated to locate the corresponding end of the identified energy down region. According to an embodiment, the end of an energy down region is characterized by frames having filtered low energy change that satisfies, e.g., is less than, a specified end slope threshold.

In step 808, the frames of the identified energy down region are evaluated against a specified energy change threshold. If the frames of the identified energy down region satisfy, i.e., exceed, the specified energy change threshold, then the identified energy down region qualifies as an energy down type no-cross region.

Once the energy down type no-cross region has been identified, then in step 810, the boundaries of the energy down type no-cross region are refined using unfiltered low energy. First, the left edge of the energy down type no-cross region is refined by finding the first frame that has energy less than a specified edge threshold from the beginning of the energy down type no-cross region. Second, the right edge of the energy down type no-cross region is refined by finding the first frame that has energy less than the specified edge threshold more than the end of the energy down type no-cross region. Third, the largest one frame decrease, i.e., with the largest downward slope, is located.

Finally, in step 812, a specified pad amount is subtracted from the refined starting boundaries and added to the refined ending boundaries of the energy down type no-cross regions. The process is complete in step 814.

iii. Dip

Figure 9:
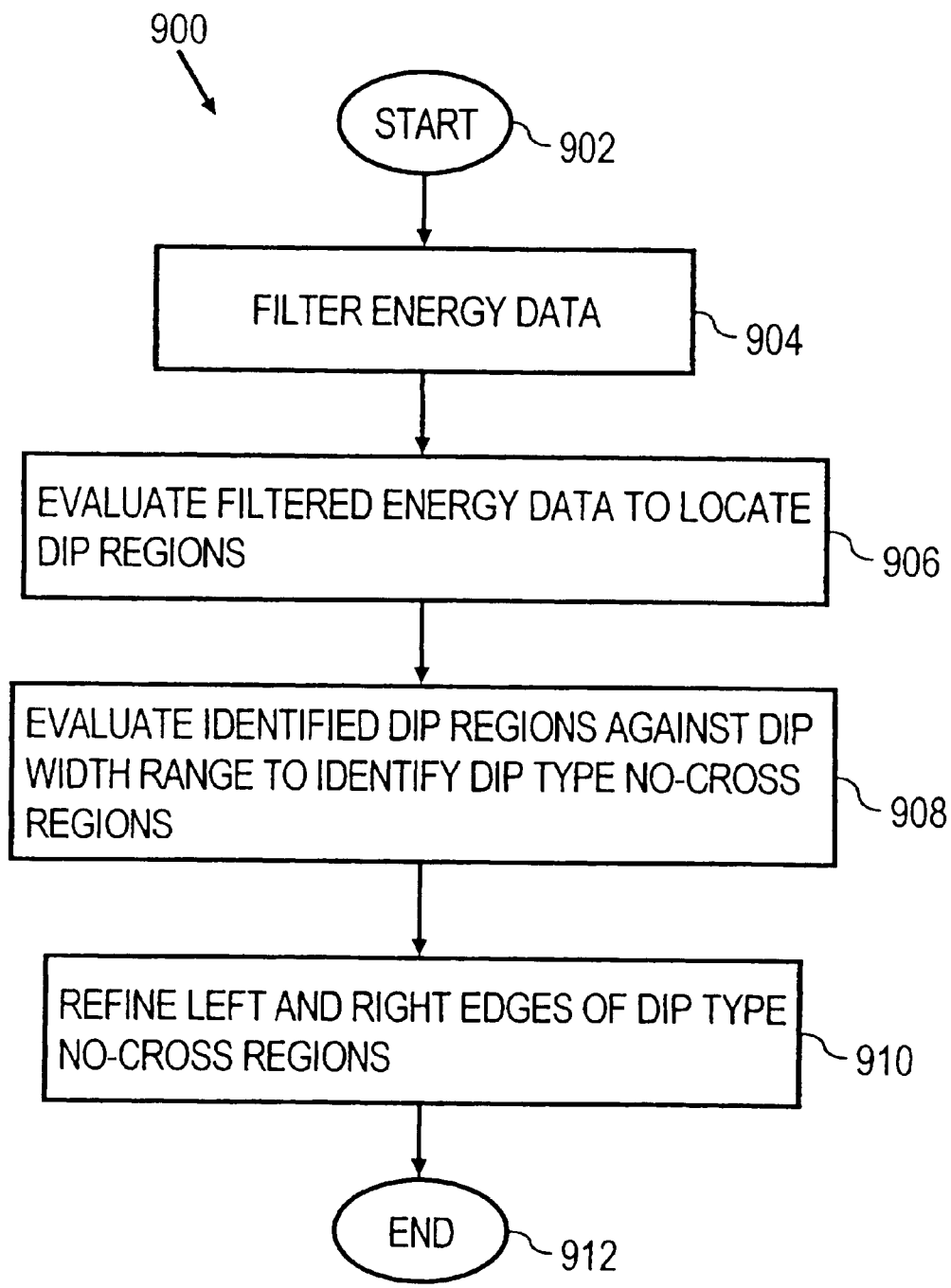
FIG. 9 is a flow diagram that illustrates an approach for identifying a dip type no-cross region according to an embodiment.

A dip type no-cross region is generally characterized by a drop in filtered energy followed by a rise in filtered energy that occurs within a specified period of time. FIG. 9 is a flow diagram 900 that illustrates an approach for identifying a dip type no-cross region according to an embodiment. After starting in step 902, in step 904, energy data received by segmenter 100 is filtered using, e.g., a low pass filter. The filtered energy data may be the same data used in the approaches described herein for identifying energy up and energy down type no-cross regions. For example, according to one embodiment, low frequency energy contained in utterance data 102 (FIG. 1) (as opposed to Cepstral coefficients $C_0$) are filtered to remove noise that might otherwise be interpreted as an energy up characteristic.

In step 906, frames of utterance data 102 are evaluated to identify the start of a candidate dip type no-cross region. According to an embodiment, the start of a candidate dip type no-cross region is characterized by a drop in energy that exceeds a specified dip depth from the most recent maximum. Once the start of a candidate dip type no-cross region has been detected, the local minimum (the bottom of the dip) is found, usually within a few frames. Once the local minimum has been found, adjacent frames are evaluated to locate the corresponding end of the identified candidate dip type no-cross region. According to an embodiment, the end of a candidate dip region is characterized by a rise in energy that exceeds the specified dip depth from the local minimum.

In step 908, once a candidate dip type no-cross region has been identified, the width of the identified candidate dip type no-cross region is checked against specified dip width criteria. For example, the dip width criteria may specify a minimum and maximum acceptable width. If the dip type no-cross region satisfies the dip width criteria, then the candidate dip type no-cross region is kept and qualifies as a dip type no-cross region.

Once a dip type no-cross region has been identified, then in step 910, the boundaries of the dip type no-cross region are refined using the same filtered low frequency energy. First, the left edge of the dip type no-cross regions is refined by searching backwards from the local minimum to find the first frame that has energy more than a specified dip edge threshold from the local minimum. This is the new start. Then the right edge of the dip type no-cross regions is refined by searching forward from the local minimum to find the first frame that has energy more than a specified dip edge threshold from the local minimum. This is the new end. Add the region from start to end as a dip type no-cross region. The process is complete in step 912.

iv. Broad Category (consonant, vowel, silence)

According to one embodiment, broad category analysis is used to identify a broad category type no-cross region. Broad category analysis involves scoring frames for a set of specified broad categories using a neural network. The scores indicate the probability that a particular frame contains the specified broad categories. According to one embodiment, the set of specified broad categories include consonant, vowel and silence.

A broad category type no-cross region is established between any two frames, adjacent or non-adjacent, in which at least one of the specified broad categories has a summed score of 0.8 or greater for different broad categories. The broad category type no-cross region is also extended to the left and right by a specified number of frames to pad the broad category type no-cross region. For example, if frame $f_{22}$ has a silence score of 0.92 and frame $f_{31}$ has a sonorant score of 0.88, a broad category type no-cross region is established from frame $f_{19}$ to frame $f_{34}$.

8. Selecting Final Segments from Candidate Segments

Once the set of candidate segments has been determined, the set of final segments is determined from the set of candidate segments. For every boundary, the set of possible segments ending at that boundary is defined by all the previous boundaries which don't lie on the other side of a no-cross region. This set could be quite large. In order to control computation, only the N (e.g. 5) best segments ending at each boundary are kept.

In order to compute the goodness of a segment, the probability that each candidate boundary is really a boundary is estimated based on the size of the Cepstral and phonetic differences at that boundary. Then the goodness of a segment is a function of the probability that the candidate end boundaries are real boundaries and the probability that any candidate boundaries lying within the segment are not real boundaries.

Figure 10:
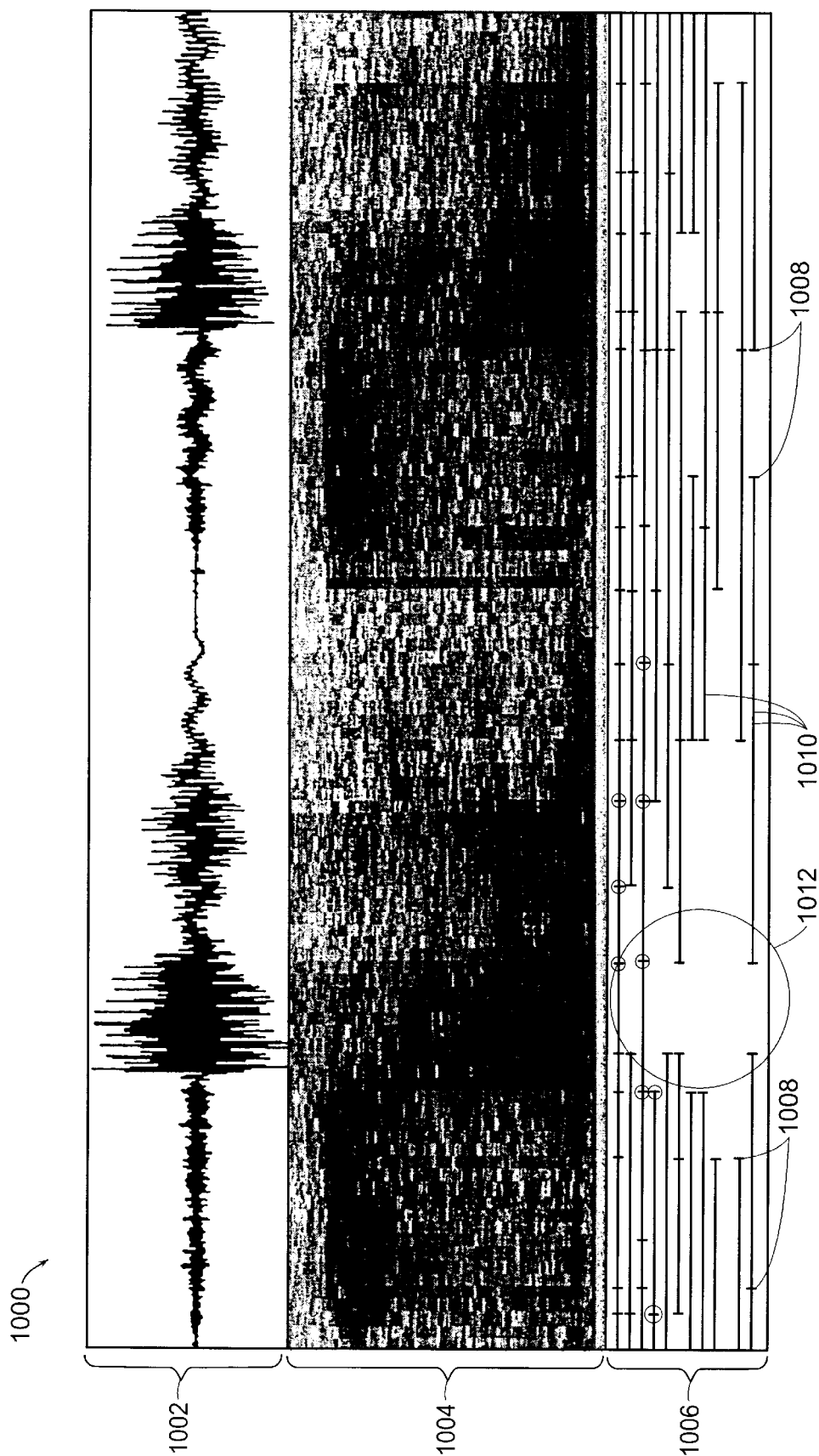
FIG. 10 is a diagram illustrating an approach for selecting the final segments according to an embodiment.

FIG. 10 is a diagram 1000 illustrating an approach for selecting the final segments according to an embodiment. Diagram includes an utterance waveform 1002 for a particular utterance and a spectragram 1004 that graphically illustrates the energy of the particular utterance.

Diagram 1000 also includes a segment lattice graph 1006 that illustrates the candidate segments determined in accordance with an embodiment. Lattice graph 1006 includes a set of filtered candidate boundaries 1008, as designated by the small vertical marks, as determined according to the approach described herein. Lattice graph 1006 also includes a set of candidate segments 1010 determined in accordance with the approach described herein. An energy up type no-cross region is generally indicated by circle 1012. Lattice graph 1006 also includes a set of final segments for the first word indicated by the circled boundaries.

9. Pipelining Considerations

The segmentation approach described herein for modeling speech in a speech recognition system is applicable to both offline applications and online applications. In offline applications, utterance data for an entire utterance is typically received and stored offline to be processed at a later time. Since timing is usually not critical in offline applications, all of the data for an entire utterance may be processed at once using the approach described herein.

In contrast to offline applications, in online applications, utterance data is received and processed "on-the-fly." This means that utterance data is received in chunks that represent portions of utterances or entire utterances, and must be continually processed in a relatively short period of time. This process is commonly known as pipelining. A common example of an online application is an automated airline reservation system where customers can conduct transactions by speaking their desired choices into a telephone. In online applications, utterance data must be processed more quickly than in offline applications. This makes the amount of resources required by a particular approach to process utterance data of high importance.

As applied to the approach described herein for modeling speech in a speech recognition system, several special considerations are made to support pipelining since the identification of a boundary within the current frame depends upon N number of frames of utterance data before and after the current frame. First, the processing of a current frame, for example boundary identification, does not begin until N number of frames of data after the current frame have been received. For example, referring to FIG. 3, for N=3, the processing of frame $F_5$ cannot begin until frames $F_6$ and $F_7$ have been received. This allows boundary detection to be performed on frame $F_5$ using frames $F_2$, $F_3$ and $F_4$ and frames $F_5$, $F_6$ and $F_7$, as previously described herein.

Second, a sufficient number of frames of utterance data from prior "chunks" of utterance data must be maintained to enable processing of subsequent chunks of utterance data. For example, referring again to FIG. 3, suppose that in a particular speech recognition system utterance data is received in ten frame chunks, where frames of utterance data 302 represent one ten frame chunk. For frame $F_{10}$ of frames of utterance data 302 to be processed using the techniques described herein, prior utterance data must be used. For example, frames $F_1$, $F_2$ and $F_3$ of a prior chunk and frames $F_7$, $F_8$ and $F_9$ from frames of utterance data 302 would be used to process frame $F_{10}$.

10. Implementation Mechanisms

A. Overview

The approach described herein for modeling speech in a speech recognition system may be implemented in computer software, in hardware circuitry, or as a combination of computer software and hardware circuitry. Accordingly, the invention is not limited to a particular computer software or hardware circuitry implementation. For example, the approach may be implemented in segmenter 100 as part of a speech recognition system (not illustrated). As another example, the approach may be implemented as a stand-alone mechanism that interacts with a speech recognition system.

B. Implementation Hardware

Figure 11:
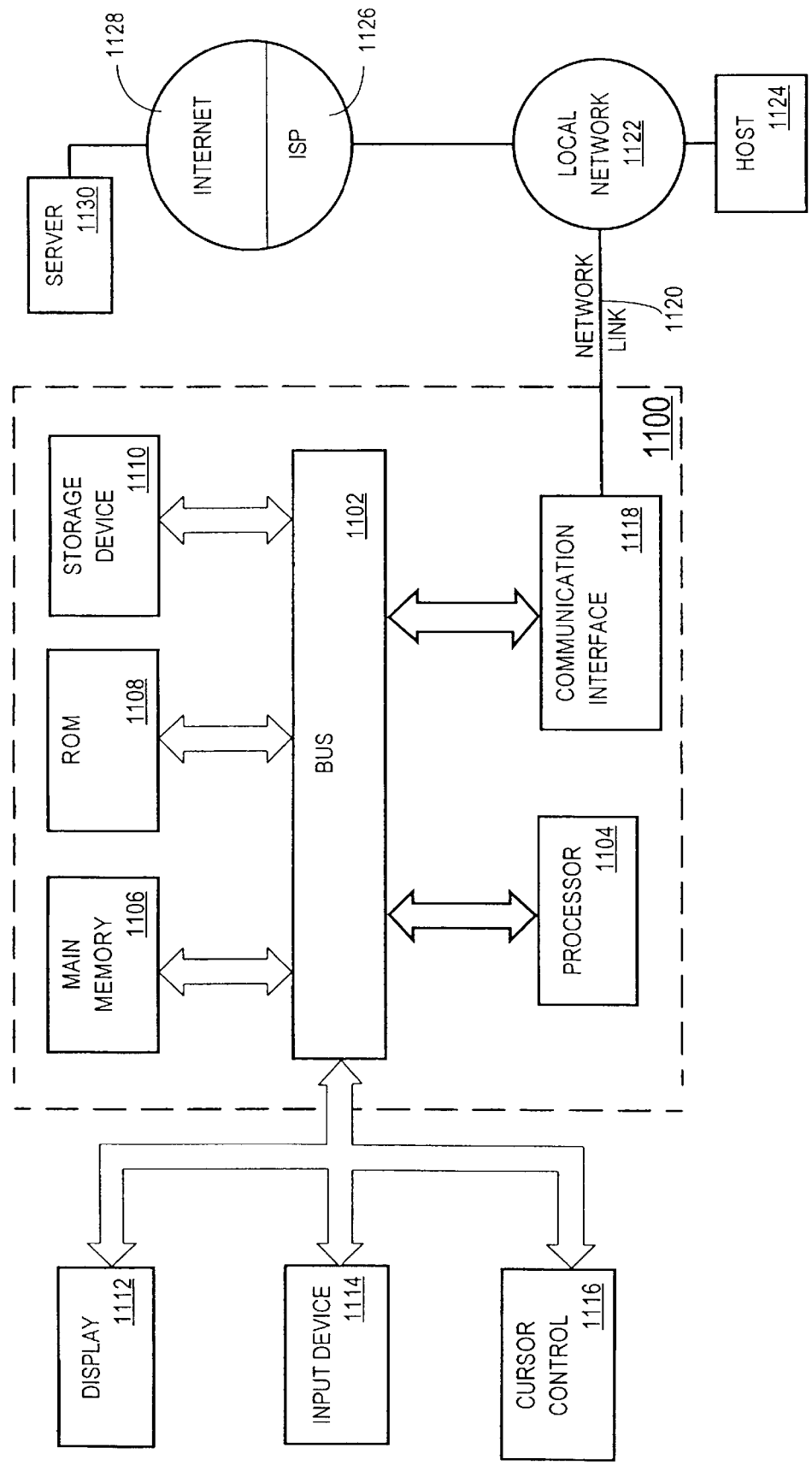
FIG. 11 is a block diagram of a computer system on which embodiments may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for modeling speech in a speech recognition system. According to one embodiment of the invention, modeling speech in a speech recognition system is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for the modeling of speech in a speech recognition system as described herein.

The received code may be executed by processor 1104 as it is received, and/or stored in storage device 1110, or other non-volatile storage for later execution. In this manner, computer system 1100 may obtain application code in the form of a carrier wave.

The segmentation approach described in this document for modeling speech in a speech recognition system is provides several advantages over prior approaches. In particular, the determination of candidate boundaries based upon changes in Cepstral coefficient values, changes in utterance energy, changes in phonetic classification, broad category analysis (retroflex, back vowels, front vowels) and sonorant onset detection ensures that phonetic unit boundaries are accurately detected. The filtering of candidate boundaries reduces the number of candidate segments, thereby reducing the amount of computational resources that is required to process the candidate segments. The filtering of candidate segments using no-cross region analysis reduce the amount of computational resources that is required to select the final segments. Thus, the approach describe herein provides a relatively high level of phonetic unit detection accuracy while reducing the amount of computational resources.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically determining a set of phonetic units from a body of utterance data, the method comprising the computer-implemented steps of:
   receiving the body of utterance data;
   determining a first set of candidate phonetic units from the body of utterance data;
   determining a set of no-cross regions from the body of utterance data wherein the no-cross regions correspond to a time span of utterance data having a high probability of containing a boundary between phonetic units;
   filtering the first set of candidate phonetic units to generate a subset of candidate phonetic units therefrom wherein the filtering analyzes the candidate phonetic units to determine if the candidate spans a no-cross region for the utterance data such that the subset omits candidate phonetic units which spanned a no-cross region.

2. The method as recited in claim 1, wherein the step of determining a set of candidate phonetic units from the body of utterance data includes identifying peaks in a smoothed Cepstral change measure.

3. The method as recited in claim 1, wherein the step of determining a set of candidate phonetic units from the body of utterance data includes identifying peaks in a smoothed energy change measure.

4. The method as recited in claim 1, wherein the step of determining a set of candidate phonetic units from the body of utterance data includes identifying peaks in a smoothed phonetic classification measure.

5. The method as recited in claim 1, wherein the step of determining a set of candidate phonetic units from the body of utterance data includes identifying the presence of regions with a high probability of belonging to some broad phonetic category and adding boundaries at the edges.

6. The method as recited in claim 1, wherein the step of determining a set of candidate phonetic units from the body of utterance data includes detecting the onset of a sonorant and adding an additional boundary to account for possible voiced stops.

7. The method as recited in claim 1, wherein the step of determining a set of candidate phonetic units from the body of utterance data includes discarding one or more boundaries that are within a specified proximity to at least one other boundary having a higher priority.

8. The method as recited in claim 1, wherein the step of determining a set of candidate phonetic units from the body of utterance data includes discarding one or more boundaries that are determined to be contained in a silence region.

9. The method as recited in claim 1, wherein the step of filtering the set of candidate phonetic units using no-cross region analysis includes discarding one or more candidate phonetic units from the set of candidate phonetic units that completely span at least one no-cross region from the set of one or more no-cross regions.

10. The method as recited in claim 9, wherein identifying a set of one or more no-cross regions includes identifying a change in utterance energy that satisfies specified no-cross region criteria.

11. The method as recited in claim 10, wherein the specified no-cross region criteria includes a minimum increase in utterance energy and identifying a set of one or more no-cross regions includes identifying an increase in utterance energy that exceeds the minimum increase in utterance energy.

12. The method as recited in claim 11, wherein the specified no-cross region criteria includes a minimum decrease in utterance energy and identifying a set of one or more no-cross regions includes identifying a decrease in utterance energy that exceeds the minimum decrease in utterance energy.

13. The method as recited in claim 11, wherein the specified no-cross region criteria includes dip no-cross region criteria and identifying a set of one or more no-cross regions includes identifying a region of utterance data with a dip in energy that satisfies the dip no-cross region criteria.

14. The method as recited in claim 11, wherein the specified no-cross region criteria includes broad category change no-cross region criteria and identifying a set of one or more no-cross regions includes identifying a region of utterance data over which the broad phonetic classification changed sufficiently to satisfy the broad category no-cross region criteria.

15. The method as recited in claim 1, wherein the step of selecting the set of phonetic units from the set of filtered candidate phonetic units includes selecting the set of N number of phonetic units having the relatively highest probability of boundaries at the ends and relatively lowest probability of boundaries internal to the unit.

16. A computer-readable medium carrying one or more sequences or one or more instructions for automatically determining a set of phonetic units from a body of utterance data, the one or more sequences or one or more instructions including instructions which, when executed by one or more processors, cause the one or more processors to perform the steps of:
receiving the body of utterance data;
determining a first set of candidate phonetic units from the body of utterance data;
determining a set of no-cross regions from the body of utterance data wherein the no-cross regions correspond to a time span of utterance data having a high probability of containing a boundary between phonetic units;
filtering the first set of candidate phonetic units to generate a subset of candidate phonetic units therefrom wherein the filtering analyzes the candidate phonetic units to determine if the candidate spans a no-cross region for the utterance data such that the subset omits candidate phonetic units which spanned a no-cross region.

17. The computer-readable medium as recited in claim 16, wherein the step of determining a set of candidate phonetic units from the body of utterance data includes identifying peaks in a smoothed Cepstral change measure.

18. The computer-readable medium as recited in claim 16, wherein the step of determining a set of candidate phonetic units from the body of utterance data includes identifying peaks in a smoothed energy change measure.

19. The computer-readable medium as recited in claim 16, wherein the step of determining a set of candidate phonetic units from the body of utterance data includes identifying peaks in a smoothed phonetic classification measure.

20. The computer-readable medium as recited in claim 16, wherein the step of determining a set of candidate phonetic units from the body of utterance data includes identifying the presence of regions with a high probability of belonging to some broad phonetic category and adding boundaries at the edges.

21. The computer-readable medium as recited in claim 16, wherein the step of determining a set of candidate phonetic units from the body of utterance data includes detecting the onset of a sonorant and adding an additional boundary to account for possible voiced stops.

22. The computer-readable medium as recited in claim 16, wherein the step of determining a set of candidate phonetic units from the body of utterance data includes discarding one or more boundaries that are within a specified proximity to at least one other boundary having a higher priority.

23. The computer-readable medium as recited in claim 16, wherein the step of determining a set of candidate phonetic units from the body of utterance data includes discarding one or more boundaries that are determined to be contained in a silence region.

24. The computer-readable medium as recited in claim 16, wherein the step of filtering the set of candidate phonetic units using no-cross region analysis includes discarding one or more candidate phonetic units from the set of candidate phonetic units that completely span at least one no-cross region from the set of one or more no-cross regions.

25. The computer-readable medium as recited in claim 24, wherein identifying a set of one or more no-cross regions includes identifying a change in utterance energy that satisfies specified no-cross region criteria.

26. The computer-readable medium as recited in claim 25, wherein the specified no-cross region criteria includes a minimum increase in utterance energy and identifying a set of one or more no-cross regions includes identifying an increase in utterance energy that exceeds the minimum increase in utterance energy.

27. The computer-readable medium as recited in claim 26, wherein the specified no-cross region criteria includes a minimum decrease in utterance energy and identifying a set of one or more no-cross regions includes identifying a decrease in utterance energy that exceeds the minimum decrease in utterance energy.

28. The computer-readable medium as recited in claim 26, wherein the specified no-cross region criteria includes dip no-cross region criteria and identifying a set of one or more no-cross regions includes identifying a region of utterance data with a dip in energy that satisfies the dip no-cross region criteria.

29. The computer-readable medium as recited in claim 26, wherein the specified no-cross region criteria includes broad category change no-cross region criteria and identifying a set of one or more no-cross regions includes identifying a region of utterance data over which the broad phonetic classification changed sufficiently to satisfy the broad category no-cross region criteria.

30. The computer-readable medium as recited in claim 16, wherein the step of selecting the set of phonetic units from the set of filtered candidate phonetic units includes selecting the set of N number of phonetic units having the relatively highest probability of boundaries at the ends and relatively lowest probability of boundaries internal to the unit.

31. A speech recognition system for automatically determining a set of phonetic units from a body of utterance data, the speech recognition system comprising:
one or more processors; and
a memory communicatively coupled to the one or more processors, wherein the memory includes one or more sequences or one or more instructions which, when executed by the one or more processors, cause the one or more processors to perform the steps of:
receiving the body of utterance data;
determining a first set of candidate phonetic units from the body of utterance data;

determining a set of no-cross regions from the body of utterance data wherein the no-cross regions correspond to a time span of utterance data having a high probability of containing a boundary between phonetic units;

filtering the first set of candidate phonetic units to generate a subset of candidate phonetic units therefrom wherein the filtering analyzes the candidate phonetic units to determine if the candidate spans a no-cross region for the utterance data such that the subset omits candidate phonetic units which spanned a no-cross region.

32. The speech recognition system as recited in claim 31, wherein the step of determining a set of candidate phonetic units from the body of utterance data includes identifying peaks in a smoothed Cepstral change measure.

33. The speech recognition system as recited in claim 31, wherein the step of determining a set of candidate phonetic units from the body of utterance data includes identifying peaks in a smoothed energy change measure.

34. The speech recognition system as recited in claim 31, wherein the step of determining a set of candidate phonetic units from the body of utterance data includes identifying peaks in a smoothed phonetic classification measure.

35. The speech recognition system as recited in claim 31, wherein the step of determining a set of candidate phonetic units from the body of utterance data includes identifying the presence of regions with a high probability of belonging to some broad phonetic category and adding boundaries at the edges.

36. The speech recognition system as recited in claim 31, wherein the step of determining a set of candidate phonetic units from the body of utterance data includes detecting the onset of a sonorant and adding an additional boundary to account for possible voiced stops.

37. The speech recognition system as recited in claim 31, wherein the step of determining a set of candidate phonetic units from the body of utterance data includes discarding one or more boundaries that are within a specified proximity to at least one other boundary having a higher priority.

38. The speech recognition system as recited in claim 31, wherein the step of determining a set of candidate phonetic units from the body of utterance data includes discarding one or more boundaries that are determined to be contained in a silence region.

39. The speech recognition system as recited in claim 31, wherein the step of filtering the set of candidate phonetic units using no-cross region analysis includes identifying a set of one or more no-cross regions defined by the body of utterance data and discarding one or more candidate phonetic units from the set of candidate phonetic units that completely span at least one no-cross region from the set of one or more no-cross regions.

40. The speech recognition system as recited in claim 39, wherein identifying a set of one or more no-cross regions includes identifying a change in utterance energy that satisfies specified no-cross region criteria.

41. The speech recognition system as recited in claim 40, wherein the specified no-cross region criteria includes a minimum increase in utterance energy and identifying a set of one or more no-cross regions includes identifying an increase in utterance energy that exceeds the minimum increase in utterance energy.

42. The speech recognition system as recited in claim 41, wherein the specified no-cross region criteria includes a minimum decrease in utterance energy and identifying a set of one or more no-cross regions includes identifying a decrease in utterance energy that exceeds the minimum decrease in utterance energy.

43. The speech recognition system as recited in claim 41, wherein the specified no-cross region criteria includes dip no-cross region criteria and identifying a set of one or more no-cross regions includes identifying a region of utterance data with a dip in energy that satisfies the dip no-cross region criteria.

44. The speech recognition system as recited in claim 41, wherein the specified no-cross region criteria includes broad category change no-cross region criteria and identifying a set of one or more no-cross regions includes identifying a region of utterance data over which the broad phonetic classification changed sufficiently to satisfy the broad category no-cross region criteria.

45. The speech recognition system as recited in claim 31, wherein the step of selecting the set of phonetic units from the set of filtered candidate phonetic units includes selecting the set of N number of phonetic units having the relatively highest probability of boundaries at the ends and relatively lowest probability of boundaries internal to the unit.

* * * * *